US008686895B2

(12) United States Patent
Nyberg

(10) Patent No.: US 8,686,895 B2
(45) Date of Patent: Apr. 1, 2014

(54) PULSED RADAR LEVEL GAUGE SYSTEM WITH HIGHER ORDER HARMONIC REGULATION

(75) Inventor: Håkan Nyberg, Linköping (SE)

(73) Assignee: Rosemount Tank Radar AB, Gothenburg (SE)

( * ) Notice: Subject to any disclaimer, the term of this patent is extended or adjusted under 35 U.S.C. 154(b) by 514 days.

(21) Appl. No.: 13/097,385

(22) Filed: Apr. 29, 2011

(65) Prior Publication Data

US 2012/0274500 A1 Nov. 1, 2012

(51) Int. Cl.
 *G01S 13/08* (2006.01)
(52) U.S. Cl.
 USPC .......................... 342/124; 73/290 R; 73/290 V
(58) Field of Classification Search
 USPC .............................. 342/124; 73/290 R–290 V
 See application file for complete search history.

(56) References Cited

U.S. PATENT DOCUMENTS

| 6,072,427 | A | 6/2000 | McEwan ........................ 342/175 |
| 2006/0220947 | A1 | 10/2006 | Kornbichler et al. ......... 342/118 |
| 2009/0322593 | A1* | 12/2009 | Hall et al. ...................... 342/124 |
| 2010/0098408 | A1 | 4/2010 | Lohl et al. ....................... 398/16 |

FOREIGN PATENT DOCUMENTS

WO WO 2007/065639 A1 6/2007

OTHER PUBLICATIONS

International Search Report for PCT Application No. PCT/EP2011/066846, dated Mar. 2, 2012, 3 pages.
Written Opinion for International Search Report for PCT Application No. PCT/EP2011/066846, dated Mar. 2, 2012, 4 pages.

* cited by examiner

*Primary Examiner* — Timothy A Brainard
(74) *Attorney, Agent, or Firm* — Westman, Champlin & Koehler, P.A.

(57) ABSTRACT

A radar level gauge system comprising first pulse generating circuitry for generating a transmission signal, second pulse generating circuitry for generating a reference signal; and frequency control circuitry for controlling the second pulse generating circuitry to achieve a predetermined frequency difference between the transmission signal and the reference signal. The radar level gauge system further comprises first frequency selection circuitry configured to provide a higher order harmonic frequency component of the transmission signal to the frequency control circuitry; and second frequency selection circuitry configured to provide a higher order harmonic frequency component of the reference signal to the frequency control circuitry. The frequency control circuitry is configured to control the second pulse generating circuitry based on the higher order harmonic frequency component of the transmission signal and the higher order harmonic frequency component of the reference signal. Hereby, improved regulation of the reference signal can be achieved substantially without any increase in power consumption of the radar level gauge system.

15 Claims, 3 Drawing Sheets

PULSED RADAR LEVEL GAUGE SYSTEM WITH HIGHER ORDER HARMONIC REGULATION

TECHNICAL FIELD OF THE INVENTION

The present invention relates to a method of determining a filling level of a product contained in a tank using a pulsed radar level gauge system, and to a pulsed radar level gauge system.

TECHNICAL BACKGROUND

Radar level gauge (RLG) systems are in wide use for determining the filling level of a product contained in a tank. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe acting as a waveguide. The probe is generally arranged to extend vertically from the top towards the bottom of the tank. The probe may also be arranged in a measurement tube, a so-called chamber, that is connected to the outer wall of the tank and is in fluid connection with the inside of the tank.

The transmitted electromagnetic signals are reflected at the surface of the product, and the reflected signals are received by a receiver or transceiver comprised in the radar level gauge system. Based on the transmitted and reflected signals, the distance to the surface of the product can be determined.

More particularly, the distance to the surface of the product is generally determined based on the time between transmission of an electromagnetic signal and reception of the reflection thereof in the interface between the atmosphere in the tank and the product contained therein. In order to determine the actual filling level of the product, the distance from a reference position to the surface is determined based on the above-mentioned time (the so-called time-of-flight) and the propagation velocity of the electromagnetic signals.

Most radar level gauge systems on the market today are either so-called pulsed radar level gauge systems that determine the distance to the surface of the product contained in the tank based on the difference in time between transmission of a pulse and reception of its reflection at the surface of the product, or systems that determine the distance to the surface based on the phase difference between a transmitted frequency-modulated signal and its reflection at the surface. The latter type of systems are generally referred to as being of the FMCW (Frequency Modulated Continuous Wave) type.

For pulsed radar level gauge systems, time expansion techniques are generally used to resolve the time-of-flight.

Such pulsed radar level gauge systems typically have a first oscillator for generating a transmission signal formed by pulses for transmission towards the surface of the product contained in the tank with a transmitted pulse repetition frequency $f_t$, and a second oscillator for generating a reference signal formed by reference pulses with a reference pulse repetition frequency $f_r$, that differs from the transmitted pulse repetition frequency by a given frequency difference $\Delta f$. This frequency difference $\Delta f$ is typically in the range of Hz or tens of Hz.

At the beginning of a measurement sweep, the transmission signal and the reference signal are synchronized to have the same phase. Due to the frequency difference $\Delta f$, the phase difference between the transmission signal and the reference signal will gradually increase during the measurement sweep. During the measurement sweep, the reflection signal formed by the reflection of the transmission signal at the surface of the product contained in the tank is being correlated with the reference signal, to form a measurement signal based on a time correlation between the reflection signal and the reference signal. Based on the measurement signal, the filling level can be determined.

Typically, oscillator regulation of the second oscillator in relation to the first oscillator in the radar level gauge system is based on the frequency difference $\Delta f$. However, due to the low frequency of the frequency difference $\Delta f$, the response of the oscillator regulation is slow and cannot in a suitable manner control, or mitigate, frequency disturbances faster than the frequency difference $\Delta f$.

In order to provide a faster response of the oscillator regulation, it is known to increase the oscillator frequency of one or both of the oscillator in order to provide a frequency difference $\Delta f$ signal with a higher frequency, and then divide the oscillator frequency down to the operating frequency, such as is, for example, disclosed by U.S. Pat. No. 6,072,427.

Although providing for more frequent regulation of the frequency of the reference signal, the higher frequency oscillator(s) results in an increased power consumption.

SUMMARY OF THE INVENTION

In view of the above-mentioned and other drawbacks of the prior art, a general object of the present invention is to provide an improved radar level gauge system and method, and in particular a pulsed radar level gauge system and method enabling improved oscillator regulation performance and/or more energy efficient filling level determination.

According to a first aspect of the present invention, these and other objects are achieved by a radar level gauge system, for determining a filling level of a product contained in a tank, the radar level gauge system comprising: first pulse generating circuitry for generating a transmission signal in the form of a first pulse train having a first pulse repetition frequency, second pulse generating circuitry for generating a reference signal in the form of a second pulse train; frequency control circuitry for controlling the second pulse generating circuitry to generate said second pulse train with a second pulse repetition frequency, the second pulse repetition frequency differing from the first pulse repetition frequency by a predetermined frequency difference; a propagation device connected to the first pulse generating circuitry and arranged to propagate the transmission signal towards a surface of the product inside the tank, and to return a reflected signal resulting from reflection of the transmission signal at the surface of the product contained in the tank; measurement circuitry connected to the propagation device and to the second pulse generating circuitry, the measurement circuitry being configured to form a measurement signal based on the reflected signal and the reference signal; and processing circuitry connected to the measurement circuitry for determining a value indicative of a filling level based on the measurement signal, wherein the radar level gauge system further comprises: first frequency selection circuitry arranged between the first pulse generating circuitry and the frequency control circuitry and configured to provide a higher order harmonic frequency component of the transmission signal to the frequency control circuitry; and second frequency selection circuitry arranged between the second pulse generating circuitry and the frequency control circuitry and configured to provide a higher order harmonic frequency component of the reference signal to the frequency control circuitry, the frequency control circuitry being configured to control the second pulse generating circuitry based on the higher order harmonic frequency component of the transmission signal and the higher order harmonic frequency component of the reference signal.

The present invention is based on the realization that improved regulation of the reference signal can be achieved substantially without any increase in power consumption by extracting higher order harmonic frequency components of the transmission signal and the reference signal and controlling the pulse repetition frequency of the reference signal based on those higher order harmonic frequency components.

In this way, since a frequency difference between the higher order harmonic frequency components can be detected several times more frequently (three times more frequently if the third order harmonic frequency components are used etc), faster variations can be detected and compensated for, and the frequency of the reference signal can be regulated faster and more accurately.

In order to provide the higher order harmonic frequency components, the frequency selection circuitries may, for example, comprise harmonics filters which may be formed by various filter designs, such as different types of band pass filters, depending on e.g. the frequency range. In order to filter out the intended harmonic frequency component in either the transmission or reference signals, the first and second frequency selection circuitry may be adapted to allow passage of a frequency range corresponding to the order of the higher order component (N) times an expected frequency variation of the first or second pulse generating circuitries, respectively.

Since various embodiments of the present invention provide for faster regulation of the reference signal, a short start-up time c
an be achieved. In particular, this can be achieved substantially without any increase in the power consumption. This makes the pulsed radar level gauge system according to embodiments of the present invention particularly useful for applications where the radar level gauge system is not connected to fixed power lines, but is powered locally through one or several batteries or other local power source(s), such as wireless radar level gauge systems, for which a low energy consumption is important.

The radar level gauge system according to the present invention is intended for determining a filling level of a product contained in a tank, wherein the tank may be any container or vessel capable of containing a product, and may be metallic, or partly or completely non-metallic, open, semi-open, or closed. Furthermore, the filling level of the product contained in the tank may be determined directly by using a signal propagation device propagating the transmission signal towards the product inside the tank, or indirectly by using a propagation device disposed inside a so-called chamber located on the outside of the tank, but being in fluid connection with the inside of the tank in such a way that the level in the chamber corresponds to the level inside the tank. The transmission signal is an electromagnetic signal.

Either or both of the first pulse generating circuitry and the second pulse generating circuitry may be provided in the form of a voltage controlled oscillator (VCO) circuit, which may comprise a crystal oscillator. Alternatively, either or both of the first pulse generating circuitry and the second pulse generating circuitry may comprise a resonator element formed by electronic circuitry comprising a portion with inductive characteristics and a portion with capacitive characteristics. Furthermore, the frequency control circuitry may be provided in the form of regulator or a circuitry comprising a regulator, such as a sampled or continuous P, PI, or PID type regulator.

For example, according to various embodiments of the invention, the predetermined frequency difference between the second pulse repetition frequency and the first pulse repetition frequency may be controlled, by controlling the second pulse generating circuitry using the frequency-control circuitry, continuously during operation of the radar level gauge system, or during pre-sweep initiation operation prior to a sweep.

It should further be noted that any one or several of the means comprised in the circuitry may be provided as either of a separate physical component, separate hardware blocks within a single component, or software executed by one or several microprocessors.

According to an exemplifying embodiment, the first frequency selection circuitry may be configured to provide a third or higher order odd harmonic frequency component of the transmission signal to the frequency control circuitry; and the second frequency selection circuitry may be configured to provide a third or higher order odd harmonic frequency component of the reference signal to the frequency control circuitry. By providing third or higher order (N) odd harmonic frequency components of the transmission and reference signals, respectively, to the frequency control circuitry, wherein N may be 3, 5, 7, etc. which provides harmonics components having a frequency N times the fundamental frequency, the frequency control circuitry may regulate the frequency difference between the transmission signal and reference signal in an improved manner. For example, the frequency control circuitry is able to control N times faster disturbances compared to known techniques according to prior art.

The first frequency selection circuitry and the second frequency selection circuitry may be configured to provide the same order harmonic frequency component of the transmission signal and the reference signal, respectively, to the frequency control circuitry. This simplifies the handling of the higher order frequency components. In particular, additional processing of the harmonic frequency components, in order to e.g. scale their frequencies into the same frequency regime, is not necessary. Furthermore, similar frequency selection devices and circuitry components may advantageously be utilized. However, according to an embodiment of the present invention, it may be advantageous, in some cases, to provide harmonic frequency components of different orders to the frequency control circuitry. For example, any mutual disturbance, or influence, between the first frequency selection circuitry and the second frequency selection circuitry may be avoided or at least reduced, if they are configured to provide higher order harmonic frequency components of different order.

According to a further exemplifying embodiment of the present invention, the frequency control circuitry may be configured to control the second pulse generating circuitry based on a frequency difference between the higher order harmonic frequency component of the transmission signal and the higher order harmonic frequency component of the reference signal.

Moreover, according to various embodiments, the frequency control circuitry may comprise mixing circuitry connected to the first and the second frequency selection circuitry, the mixing circuitry being configured to generate a control signal indicative of the frequency difference between the higher order harmonic frequency component of the transmission signal and the higher order harmonic frequency component of the reference signal, the frequency control circuitry being configured to control the second pulse generating circuitry based on the control signal.

The transmission signal and the reference signal may, for example, be square wave signals. However, any signal may be represented by a sum of harmonic frequency components, and in various embodiments of the present invention, the transmission signal and the reference signal may be provided as pulse train with any pulse shape, as long as the a suitable higher order harmonic can be extracted from the signals.

Furthermore, according to a embodiment of the present invention, the second pulse generating circuitry may comprise a voltage controlled oscillator; and the frequency control circuitry may be configured to provide a voltage to the voltage controlled oscillator based on the higher order harmonic frequency component of the transmission signal and the higher order harmonic frequency component of the reference signal.

According to a further embodiment, the propagation device may be a transmission line probe arranged to extend towards and into the product contained in the tank for guiding the transmission signal towards the surface of the product, and guiding the reflected signal back along the transmission line probe.

According to another embodiment, the propagation device may comprise an antenna device for radiating the transmission signal towards the surface of the product contained in the tank and capturing the reflected signal resulting from reflection of the transmission signal at the surface of the product contained in the tank.

Furthermore, the radar level gauge system may advantageously be configured to be powered by a local power source, which may, for example, comprise a battery, a wind turbine, and/or solar cells etc.

Moreover, the radar level gauge system may further comprise a radio transceiver for wireless communication with an external device.

According to a second aspect of the present invention, the above-mentioned and other objects are achieved through a method of determining a filling level of a product contained in a tank using a radar level gauge system, the method comprising the steps of: generating a transmission signal, the transmission signal being in the form of a first pulse train having a first pulse repetition frequency; generating a reference signal in the form of a second pulse train having a second pulse repetition frequency, the second pulse repetition frequency differing from the first pulse repetition frequency by a predetermined frequency difference; propagating the transmission signal towards a surface of the product contained in the tank; receiving a reflected signal resulting from reflection of the transmission signal at the surface of the product; forming a measurement signal based on the reflected signal and the reference signal; and determining a value indicative of the filling level based on the measurement signal, wherein the reference signal is generated based on a higher order harmonic frequency component of the transmission signal and a higher order harmonic frequency component of the reference signal. Advantageously, the reference signal is generated so as to maintain the predetermined frequency difference between the transmission signal and the reference signal, or between the pulse repetition frequency of the transmission signal and the pulse repetition frequency of the reference signal.

The method according to the present invention is by no means is limited to performing the steps thereof in any particular order, unless so stated. Furthermore, some steps may be performed at one point in time, and other steps at another point in time.

Further embodiments of, and effects obtained through this second aspect of the present invention are largely analogous to those described above for the first aspect of the invention.

Other objectives, features, and advantages of the present invention will appear from the following detailed disclosure, from the attached dependent claims as well as from the drawings.

BRIEF DESCRIPTION OF THE DRAWINGS

The present invention will now be described in more detail, with reference to the appended drawings showing at least one exemplifying embodiment of the invention, wherein.

DETAILED DESCRIPTION OF AN EXAMPLE EMBODIMENT OF THE INVENTION

Figure 1:
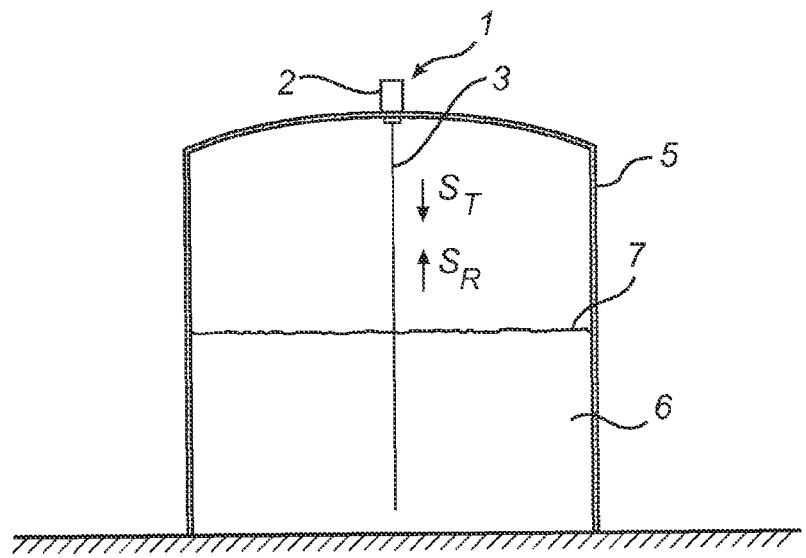
FIG. 1 schematically illustrates a radar level gauge system installed in an exemplary tank.

In the drawings, similar or equal elements are referred to by equal reference numerals. The drawings are merely schematic representations, not true to scale and should not be considered as limiting the scope of the invention. Furthermore, in the present detailed description, various embodiments of the radar level gauge system according to the present invention are mainly discussed with reference to a pulsed guided wave radar (GWR) level gauge system utilizing a rigid single line (or Goubau) probe. It should be noted that this by no means limits the scope of the present invention, which is equally applicable to a non contact radar level gauge system having a propagation device in the form of an antenna known in the art, as well as GWR-systems being equipped with various other kinds of probes, such as two-lead probes, flexible probes, etc.

FIG. 1 schematically illustrates a radar level gauge system 1 comprising a measurement electronics unit 2, and a probe 3. The radar level gauge system 1 is provided on a tank 5, which is partly filled with a product 6 to be gauged. By analyzing transmitted signals $S_T$ being guided by the probe 3 towards the surface 7 of the product 6, and reflected signals $S_R$ traveling back from the surface 7, the measurement electronics unit 2 can determine the distance between a reference position (such as the tank ceiling) and the surface 7 of the product 6, whereby the filling level can be deduced. It should be noted that, although a tank 5 containing a single product 6 is discussed herein, the distance to any material interface along the probe can be measured in a similar manner.

Figure 2:
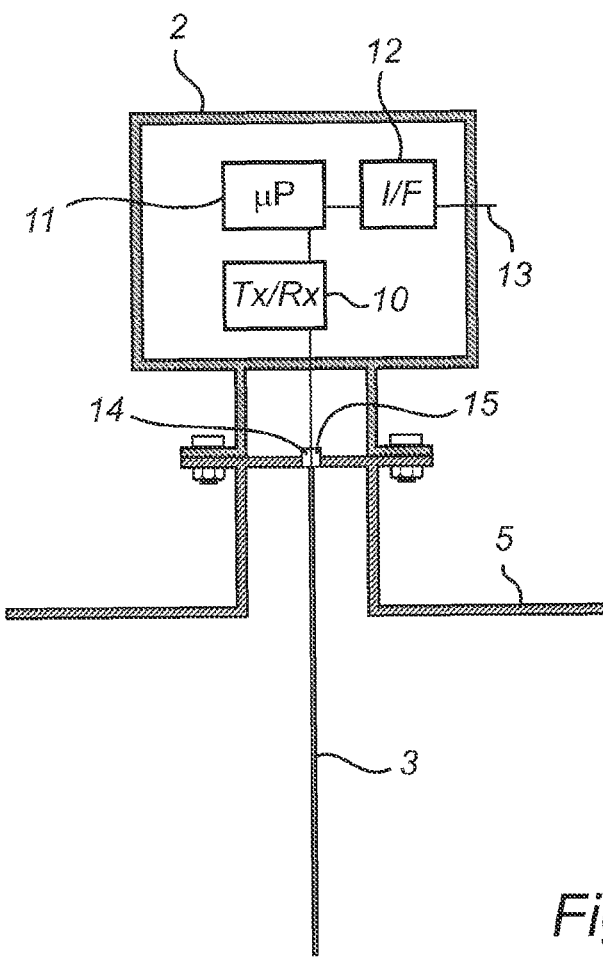
FIG. 2 is a schematic illustration of the measurement electronics unit comprised in the radar level gauge system in FIG. 1.

As is schematically illustrated in FIG. 2, the electronics unit 2 comprises a transceiver 10 for transmitting and receiving electromagnetic signals, a processing unit 11, which is connected to the transceiver 10 for control of the transceiver and processing of signals received by the transceiver to determine the filling level of the product 6 in the tank 5.

The processing unit 11 is, furthermore, connectable to external communication lines 13 for analog and/or digital communication via an interface 12. Moreover, although not shown in FIG. 2, the radar level gauge system 1 is typically connectable to an external power source, or may be powered through the external communication lines 13. Alternatively, the radar level gauge system 1 may be powered locally, and may be configured to communicate wirelessly.

Although being shown as separate blocks in FIG. 2, several of the transceiver 10, the processing circuitry 11 and the interface 12 may be provided on the same circuit board.

In FIG. 2, furthermore, the transceiver 10 is illustrated as being separated from the interior of the tank 5 and connected to the probe 3 via a conductor 14 passing through a feed-through 15 provided in the tank wall. It should be understood that this is not necessarily the case, and that at least the transceiver 10 may be provided in the interior of the tank 5.

Figure 3:
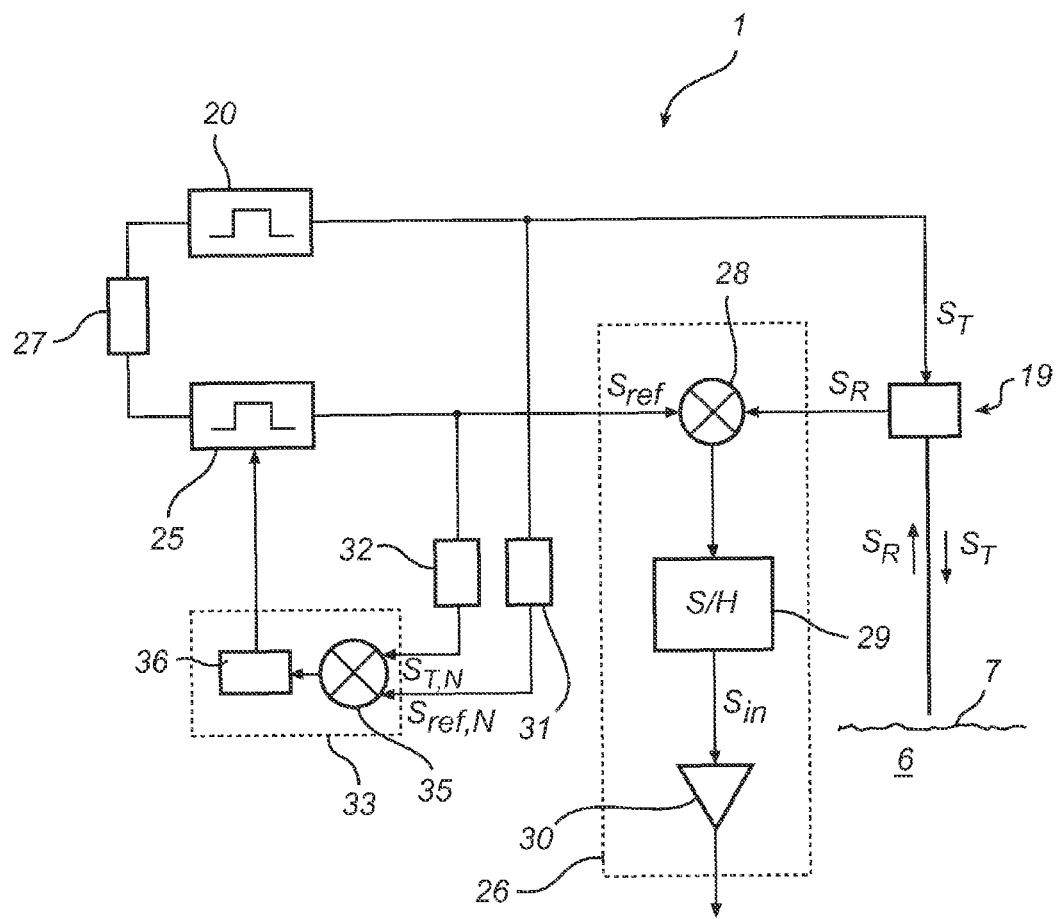
FIG. 3 is a block diagram schematically illustrating the radar level gauge system in FIG. 1 according to an embodiment of the present invention.

FIG. 3 is a block diagram schematically showing functional components comprised in the radar level gauge system in FIG. 1 according to an embodiment of the present invention. The exemplary radar level gauge system 1 comprises a transmitter branch for generating and transmitting a transmission signal $S_T$ towards the surface 7 of the product 6 contained in the tank (not shown in FIG. 3), and a receiver branch for receiving and operating on the reflected signal $S_R$ resulting from reflection of the transmission signal $S_T$ at the surface 7 of the product 6. As is indicated in FIG. 3, the transmitter branch and the receiver branch are both connected to a directional coupler 19 to direct signals from the transmitter branch to the probe 3 and to direct reflected signals being returned by the probe 3 to the receiver branch.

The transmitter branch comprises first pulse generating circuitry in the form of a first pulse generator 20, and the transmitter branch comprises a second pulse generator 25 and measurement circuitry 26. The radar level gauge system 1 further comprises a timing control unit 27 for controlling the timing relationship between the transmitted signal output by the first pulse generator and the frequency shifted reference signal $S_{REF}$ output by the second pulse generator 25.

As is schematically indicated in FIG. 3, the measurement circuitry 26 comprises a time-correlator in the form of a mixer 28, a sample-and-hold circuit 29 and amplifier circuitry 30.

It should be noted that the radar level gauge system 1 illustrated in FIG. 3 has been simplified and that radar level gauge systems according to various embodiments of the present invention may comprise additional components, such as high frequency pulse generators on the transmitter branch and the receiver branch whereby pulses each formed by an amplitude modulated pulse train can be used for determining the filling level.

Additionally, as was briefly described above with reference to FIG. 2, the radar level gauge system 1 comprises processing circuitry (not shown in FIG. 3) that is connected to the measurement circuitry 26 for determining the filling level of the product 6 contained in the tank.

When the radar level gauge system 1 in FIG. 3 is in operation to perform a filling level determination, a time correlation is performed in the mixer 28 between the reflected signal $S_R$ and the reference signal $S_{REF}$ that is output by the second pulse generator 25. The reference signal $S_{REF}$ is a signal that differs in frequency from the signal output by the first pulse generator 20, by a predetermined frequency difference $\Delta t$. When a measurement sweep starts, the reference signal $S_{REF}$ and the transmission signal $S_T$ are in phase (or in anti-phase), and then the time until the reference signal "catches up with" the reflected signal $S_R$ is determined. From this time and the frequency difference $\Delta f$, the distance to the surface 7 can be determined.

The time-expansion technique that was briefly described in the previous paragraph is well known to the person skilled in the art, and is widely used in pulsed radar level gauge systems.

As is clear from the above discussion, the output from the mixer 28 will be a sequence of values, where each value represents a time correlation between a pulse of the reference signal and the reflected signal. This sequence of values are tied together to form a continuous signal using the sample-and-hold circuit 29.

In this context it should be noted that the sample-and-hold amplifier 29 is simply an illustrative example of a device capable of maintaining a voltage level over a given time, and that there are various other devices that can provide the desired functionality, as is well known to the person skilled in the art.

As is further illustrated in FIG. 3, the radar level gauge system additionally comprises frequency control circuitry 33 which is configured to control the frequency of the second pulse generating circuitry 25. First frequency selection circuitry 31 is arranged between the frequency control circuitry 33 and the first pulse generating circuitry 20, which first frequency selection circuitry 31 is configured to provide a higher order harmonic frequency component of the transmission signal $S_T$ generated by the first pulse generating circuitry 20, to the frequency control circuitry 33. In addition, a second frequency selection circuitry 32 is arranged between the frequency control circuitry 33 and the second pulse generating circuitry 25, which second frequency selection circuitry 32 is configured to provide a higher order harmonic frequency component of the reference signal generated by the first pulse generating circuitry 25, to the frequency control circuitry 33.

As can be seen in FIG. 3, the frequency control circuit 33 comprises a mixer 35 and a regulator 36. The mixer 35 mixes the higher order harmonic frequency component $S_{T,N}$ of the transmission signal $S_T$, and the higher order harmonic frequency component $S_{ref,N}$ of the reference signal $S_{ref}$ and outputs an intermediate frequency signal with a frequency that is N times the actual frequency difference $\Delta f_{actual}$ between the transmission signal $S_T$ and the reference signal $S_{ref}$. From this signal, with frequency $N \times \Delta f_{actual}$, the actual frequency difference between the transmission signal $S_T$ and the reference signal $S_{ref}$ can be determined N times more frequently than is possible by directly sampling the transmission signal $S_T$ and the reference signal $S_{ref}$. This means that the regulator 36 can modify the control signal provided to the second pulse generating circuitry 25 N times more often.

An embodiment of the method of determining a filling level of a product contained in a tank using a radar level gauge system, according to the present invention will now be described with reference to the flow chart in FIG. 4.

Figure 4:
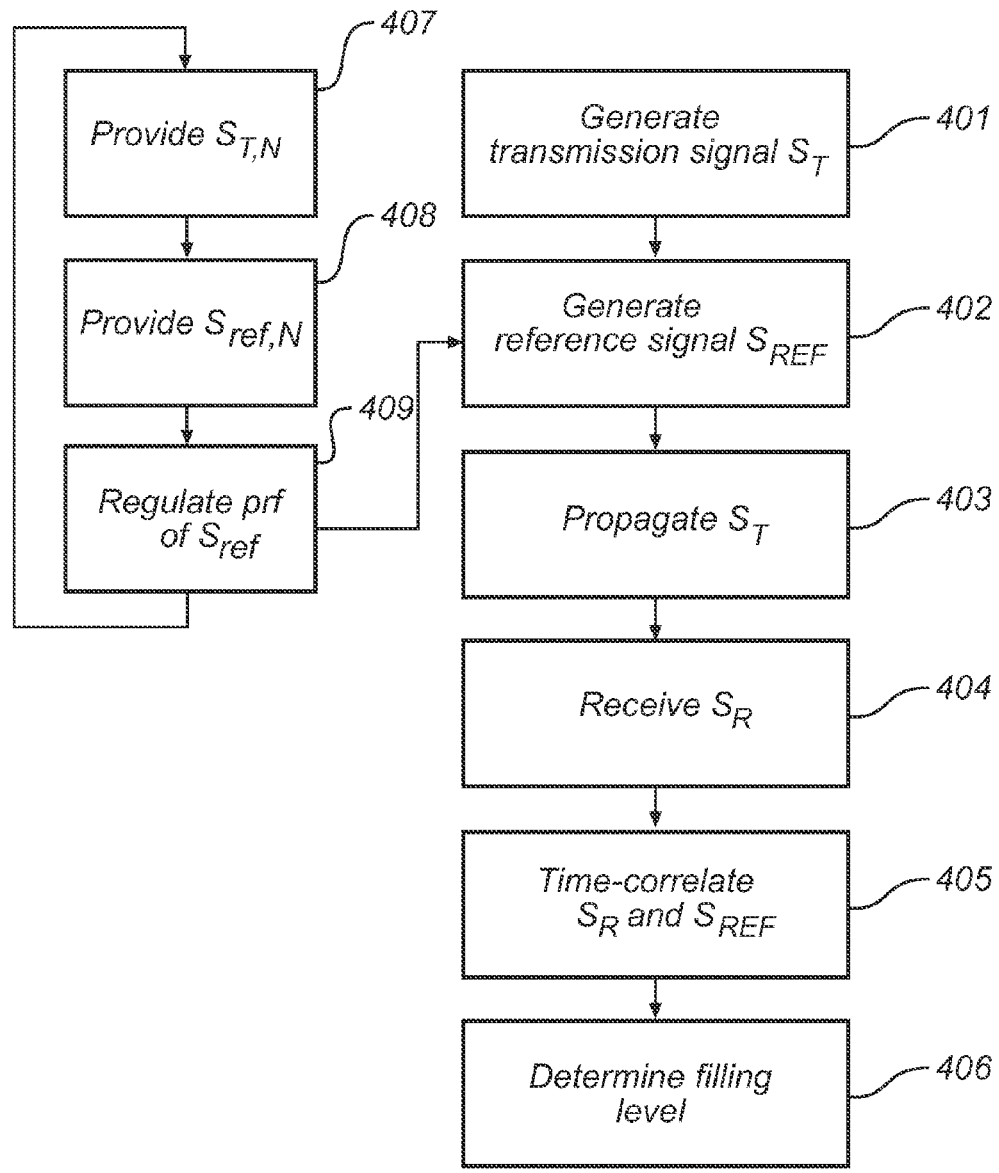
FIG. 4 is a flow chart schematically illustrating an embodiment of the method according to the present invention.

In an initial step not included in FIG. 4, the radar level gauge system may be activated at an activation time $t_0$. The radar level gauge system may, for example, be activated by providing electrical power to the radar level gauge system to take the radar level gauge system from an inactive state where very little or no energy is consumed to an active state in which filling level determination can take place.

Following activation of the radar level gauge system, a transmission signal $S_T$ is generated in step 401, and a reference signal $S_{ref}$ is generated in step 402.

In step 403, the transmission signal $S_T$ is propagated towards, with reference to FIG. 1, the surface 7 of the product 6 in the tank 5, and a reflected signal $S_R$ is received in step 404. The reference signal $S_{ref}$ and the received signal $S_R$ are time-correlated in step 405 to generate a sequence of values each representing a time correlation between a pulse of the reference signal $S_{ref}$ and the reflected signal $S_R$.

In step 406, the filling level is determined by the processing circuitry based on the result of the time correlation.

As is indicated in FIG. 4, the method further comprises steps 407-409 for regulating the pulse repetition frequency prf of the reference signal $S_{ref}$. In step 407, a higher order harmonic frequency component $S_{T,N}$ of the transmission signal $S_T$ is provided, and in step 408, higher order harmonic frequency component $S_{ref,N}$ of the reference signal $S_{ref}$ is provided. These higher order harmonic frequency components $S_{T,N}$, $S_{ref,N}$ are then, in step 409 used to regulate the pulse repetition frequency of the reference signal $S_{ref}$ so that the desired frequency different between the transmission signal $S_T$ and the reference signal $S_{ref}$ can be maintained.

It is noted that the invention has mainly been described above with reference to a few embodiments. However, as is readily appreciated by a person skilled in the art, other embodiments than the ones disclosed above are equally possible within the scope of the invention, as defined by the appended patent claims. For example, the radar level gauge system need not be provided with a directional coupler as described above in connection with FIG. 3, but may comprise separate propagating devices, such as antennas, for transmission and reception.

It is further noted that, in the claims, the word "comprising" does not exclude other elements or steps, and the indefinite article "a" or "an" does not exclude a plurality. A single apparatus or other unit may fulfill the functions of several items recited in the claims. The mere fact that certain measures are recited in mutually different dependent claims does not indicate that a combination of these measured cannot be used to advantage. It is noted, that the method and system according to the invention may be executed and operated in different orders.

What is claimed is:

1. A radar level gauge system, for determining a filling level of a product contained in a tank, the radar level gauge system comprising:
   first pulse generating circuitry for generating a transmission signal in the form of a first pulse train having a first pulse repetition frequency;
   second pulse generating circuitry for generating a reference signal in the form of a second pulse train;
   frequency control circuitry for controlling the second pulse generating circuitry to generate said second pulse train with a second pulse repetition frequency, the second pulse repetition frequency differing from the first pulse repetition frequency by a predetermined frequency difference;
   a propagation device connected to the first pulse generating circuitry and arranged to propagate the transmission signal towards a surface of the product inside the tank, and to return a reflected signal resulting from reflection of the transmission signal at the surface of the product contained in the tank;
   measurement circuitry connected to the propagation device and to the second pulse generating circuitry, the measurement circuitry being configured to form a measurement signal based on the reflected signal and the reference signal; and
   processing circuitry connected to the measurement circuitry for determining a value indicative of the filling level based on the measurement signal,
   wherein said radar level gauge system further comprises:
   first frequency selection circuitry connected to said first pulse generating circuitry and said frequency control circuitry and configured to provide a higher order harmonic frequency component of said transmission signal to said frequency control circuitry; and
   second frequency selection circuitry connected to said second pulse generating circuitry and said frequency control circuitry and configured to provide a higher order harmonic frequency component of said reference signal to said frequency control circuitry,
   said frequency control circuitry being configured to control said second pulse generating circuitry based on said higher order harmonic frequency component of the transmission signal and said higher order harmonic frequency component of the reference signal.

2. The radar level gauge system according to claim 1, wherein:
   said first frequency selection circuitry is configured to provide a third or higher order odd harmonic frequency component of the transmission signal to the frequency control circuitry; and
   said second frequency selection circuitry is configured to provide a third or higher order odd harmonic frequency component of the reference signal to the frequency control circuitry.

3. The radar level gauge system according to claim 1, wherein said first frequency selection circuitry and said second frequency selection circuitry are configured to provide the same order harmonic frequency component of the transmission signal and the reference signal, respectively, to the frequency control circuitry.

4. The radar level gauge system according to claim 1, wherein said frequency control circuitry is configure to control said second pulse generating circuitry based on a frequency difference between said higher order harmonic frequency component of the transmission signal and said higher order harmonic frequency component of the reference signal.

5. The radar level gauge system according to claim 4, wherein said frequency control circuitry comprises mixing circuitry connected to said first frequency selection circuitry and said second frequency selection circuitry, said mixing circuitry being configured to generate a control signal indicative of the frequency difference between said higher harmonic frequency component of the transmission signal and said higher harmonic frequency component of the reference signal,
   said frequency control circuitry being configured to control said second pulse generating circuitry based on said control signal.

6. The radar level gauge system according to claim 1, wherein each of said transmission signal and said reference signal is a square wave signal.

7. The radar level gauge system according to claim 1, wherein:
   said second pulse generating circuitry comprises a voltage controlled oscillator; and
   said frequency control circuitry is configured to provide a voltage to said voltage controlled oscillator based on said higher order harmonic frequency component of the transmission signal and said higher order harmonic frequency component of the reference signal.

8. The radar level gauge system according to claim 1, wherein the propagation device is a transmission line probe.

9. The radar level gauge system according to claim 1, wherein the propagation device comprises a radiating antenna.

10. The radar level gauge system according to claim 1, being powered by a local power source.

11. The radar level gauge system according to claim 10, wherein the local power source comprises at least one device selected from the group comprising a battery device, a solar cell, and a wind turbine.

12. The radar level gauge system according to claim 1, further comprising a radio transceiver for wireless communication with an external device.

13. A method of determining a filling level of a product contained in a tank using a radar level gauge system, the method comprising the steps of:

generating a transmission signal, the transmission signal being in the form of a first pulse train having a first pulse repetition frequency;

generating a reference signal in the form of a second pulse train having a second pulse repetition frequency, the second pulse repetition frequency differing from the first pulse repetition frequency by a predetermined frequency difference;

propagating the transmission signal towards a surface of the product contained in the tank;

receiving a reflected signal resulting from reflection of the transmission signal at the surface of the product;

forming a measurement signal based on the reflected signal and the reference signal; and determining a value indicative of the filling level based on the measurement signal, wherein said second pulse repetition frequency is controlled based on a higher order harmonic frequency component of the transmission signal and a higher order harmonic frequency component of the reference signal.

14. The method according to claim 13, wherein said higher order harmonic frequency component of the transmission signal and said higher order harmonic frequency component of the reference signal are of the same order.

15. The method according to claim 13, wherein said second pulse repetition frequency is controlled based on a frequency difference between said higher order harmonic frequency component of the transmission signal and said higher order harmonic frequency component of the reference signal.

* * * * *